UNITED STATES PATENT OFFICE.

JOHN E. SCHNEIDER, OF SEATTLE, WASHINGTON, ASSIGNOR TO SEATTLE ASBESTOMINE CO., OF SEATTLE, WASHINGTON, A CORPORATION.

FIREPROOF PAINT AND COATING AND PROCESS OF MAKING SAME.

1,317,225.  Specification of Letters Patent.  Patented Sept. 30, 1919.

No Drawing.   Application filed March 6, 1918.   Serial No. 220,854.

*To all whom it may concern:*

Be it known that I, JOHN E. SCHNEIDER, a citizen of the United States, residing at Seattle, in the county of King and State of Washington, have invented certain new and useful Improvements in Fireproof Paints and Coatings and Processes of Making the Same, of which the following is a specification.

This invention relates to coating compositions in the nature of paint, and particularly to those compositions containing asbestos, or like mineral fibers.

The general object is to provide a coating or paint which has fireproof and insulating qualities and which uses mineral fibers of the hornblende group as one of its main ingredients.

A further object is to provide a coating composition in which a use is made of a variety or varieties of hornblende or minerals belonging to the hornblende group which, up to the present time, have been considered practically valueless.

A further object is to provide a composition containing mineral fiber of the hornblende group or mineral fiber having like qualities which can be colored by mixing the fibrous mineral with material which will readily take up color.

A further object is to provide a coating composition in which the fibrous mineral is mixed with infusorial earth or like diatomaceous matter which acts to take up color.

A further object of the invention is to provide a method or process of preparing this composition which will reduce the asbestos or other mineral fiber to such a condition that it will mix with water or other liquids and not settle and which will so affect the diatomaceous ingredients that the air cells of the diatoms will be broken up so that the paint or other coating may be applied with an even surface, a surface not broken up by pitting, eruptions, or other like characteristics.

Other objects will appear in the course of the following description.

In the production of insulating paints or coatings, up to the present time, "chrysotile," a fibrous variety of serpentine, has been considered as the only material having any value. In the manufacture of my improved composition, I use that variety of hornblende known generically as "amphibole" (which includes tremolite, actinolite and pargosite, etc.). The fibrous hornblende group alone can be sufficiently reduced as to be used for coating walls and other smooth surfaces. I, of course, do not wish to be limited to any particular variety or species of mineral in the hornblende group.

Mixed with the crushed or finely divided fibers of hornblende is a certain portion of diatomaceous earth which has been so treated that it will take up color. Other materials may also be used in connection with these two main or principal materials, as will hereafter appear.

The process of preparing the improved composition is as follows: The asbestos (fibrous minerals of the hornblende group) is first thoroughly dried, if the fibers contain over 2% of moisture. If they contain less than 2% it is not necessary that they should be further dried. The mineral is then crushed, reduced or pulverized by any suitable machinery, and then still further crushed or pulverized so that the particles will pass through a screen having meshes of from 120 to 200 to the inch. This depends upon the physical characteristics of the mineral and upon the manner in which the composition is to be used.

Amphibole, tremolite and other varieties of the hornblende group in certain deposits are highly crystallized, while in other localities these deposits are practically free of crystallization. This difference between the crystallized and non-crystallized varieties of asbestos or fibrous materials of the hornblende group necessitates different methods of reducing. Thus with the crystallized material, the mineral must be reduced to a sufficiently fine state so that after it is mixed with water or other liquids, the particles will float.

When the particles will float on water it is an indication that the individual fibers of the mineral are separated or that the particles are not larger than individual fibers. Furthermore, it is necessary that these particles shall remain in suspension in water so that the paint eventually made from these fibers may be applied evenly to the wall or other surface.

Thus, for instance, a deposit of this material near Kamiah, Idaho, has a crystallization of about 40% which requires a very high degree of fineness, whereas deposits located near Pateros, in the State of Washington, contain but a relatively small percentage of crystallization. In the first instance, the particles must pass through a screen having 200 meshes to the inch, while in the second place, a screen having 160 meshes to the inch is sufficient to reduce the material so that the particles will float in water. Amphibole, which is highly crystallized, weighs about 185 pounds to the cubic foot, whereas when slightly crystallized, it may weigh only 120 pounds to the cubic foot. After the mineral has been reduced by grinding, crushing or pulverizing to the condition above indicated, it is ready to be mixed with the diatomaceous earth.

In order to prepare the diatomaceous infusorial earth for use with the crushed hornblende, it is necessary to grind, pulverize or otherwise reduce the earth to such a degree of fineness that the air cells within the diatoms shall be broken. The fact that diatoms contain a large percentage of air cells has heretofore made the use impractical in the manufacture of coatings or paints for smooth surfaces, for the reason that these air cells cause eruptions or air pits on the surface of the paint or coating, which not only spoils the looks of the article to which the coating is applied, but renders the coating liable to collect dirt and therefore insanitary.

It has been heretofore found practically impossible to reduce the diatoms to such a degree as to crush or break up the air cells therein by reason of a certain sticky quality of diatomaceous earth when crushed. Thus, for instance, when diatomaceous earth is crushed in a tube mill, the ground earth soon becomes clogged, adheres to the outer edges of the drum, and further reduction of the mineral is rendered practically impossible. It is therefore necessary that a vehicle of some sort should be mixed with the diatomaceous earth which will reduce this tendency to clog and stick and prevent the packing of the mineral against the outer walls of the mill. By my process, after the infusorial earth is crushed as ordinarily to a limited degree of fineness, a certain proportion of the finely crushed and bolted asbestos, amphibole or other material of the hornblende group is mixed with the finely crushed infusorial earth and is returned to the grinding machine which is preferably a pebble mill or tube mill. Now the asbestos fibers have a slippery feel, that is, these fibers have a greasy or unctuous feeling when rubbed or touched, there being no stickiness nor adhesiveness to the fibers and when this finely crushed hornblende is mixed with the crushed infusorial earth, it prevents the crushed infusorial earth from clogging and sticking to the wall of the mill so that it is now readily reduced to any suitable degree of fineness so that the air cells are broken.

For example, diatomaceous earth taken from the deposit at Quincy, Washington, reduced by ordinary methods will weigh about 23 pounds per cubic foot. The same amount of material reduced or ground in a mixture with hornblende fibers will weigh about 80 pounds per cubic foot. It is thus plain that the air cells in the individual diatoms have been broken up and thus that the diatomaceous earth has lost its characteristic of causing pits, eruptions and other uneven surfaces in a coating mixture of which it forms a part.

To the blended mixture before or after the final grinding may be added a suitable percentage of fibrous talc, as talc will give a better flow of the material when mixed with water and will give a better surface than if it is absent. A suitable binder of any desired character is intended to be used with the mixture. Coloring matter can also be added to any desired degree under certain restrictions, as will now be pointed out.

The asbestos fibers being acid proof, cannot be colored by extraneous coloring matter, though they may be colored by means which will be hereafter stated, and the chief intent of their use in my improved composition, aside from the well known value of asbestos as a fireproofing agent, are the binding qualities of the asbestos and because of its value in securing the proper grinding of the diatoms as previously stated. As the asbestos fibers cannot be colored by extraneous coloring matter, the coloring must be secured by the diatomaceous earth which readily takes up coloring matter. It follows from this, therefore, that where a deep coloring is desired, the percentage of ground asbestos or hornblende fibers must be reduced according to the shade to be obtained. For example, for general utility, the amount of asbestos or hornblende fibrous material should equal the amount of diatomaceous earth in order to obtain the best results. To secure a deep shade of any color, however, the proportions will change to 70% of crushed infusorial earth to 30% of asbestos fiber. This is particularly adapted for interior wall coatings. However, durability is reduced when a relatively large percentage of infusorial earth is used, and it is therefore best, under ordinary circumstances, to use lighter shades of coloring if durability and service are to be considered. Again this coating may be used for tin or other metals and here again the proportions of asbestos and diatomaceous earth will change in order to produce the desired results. It is more desirable for such work as this to use a larger percentage of asbestos fibers than would be necessary in a wall coating and in this case 60% of asbestos fibers would be used to 40% of diatomaceous earth. It will, therefore, be obvious that many changes may be made in the proportions of the ingredients without departing from the spirit of my invention.

Another method of coloring the composition is to use amphibole from deposits in which there is a considerable amount of moisture and then roast the amphibole or like material which oxidizes the mineral and gives it a reddish color. Thus colors are brought out fully by submitting the fibrous hornblende of this character to roasting at a high temperature, which will bring out the dormant color. This color may be reduced by adding finely crushed white materials to the mixture, thus reducing the deep colors to the desired shade.

The advantages incident to my invention are many. By preparing the composition according to my process, it is possible to use forms of fibrous hornblende which have heretofore been considered worthless as ingredients in paints or coatings. Furthermore, by my process it is possible to more finely reduce diatomaceous earth than has been possible heretofore and thus break up the air cells in the individual diatoms so as to prevent the pitting or other eruptions on the surface of the paint when the latter is applied. It is further possible by using this process to secure an asbestos product which may be colored, in which various shades of the same color may be secured and further in which the characteristic fireproofing and insulating qualities of asbestos and diatomaceous earth are retained. While I have particularly referred to asbestos as being used as a vehicle with diatomaceous earth to permit its being ground very fine, I do not wish to be limited to this, though its use is preferable, inasmuch as finely ground particles of magnesium silicate or "talc" may be used. This material also has a "greasy" or unctuous quality to the touch and also has sufficient body to act as a binder. Broadly speaking I regard any ground mineral which has the greasy feel before referred to and which is capable of being finely crushed and which will not settle when mixed with a fluid medium as being the equivalent of the asbestos or fibrous amphibole. Talc, for instance, has the quality of unctuousness but does not have the fibrous quality which is necessary in order to bind the mass together and secure the best results.

Talc, when used, gives flow to the material when the material is mixed with water, acts to some extent in the same manner as does the asbestos when ground together with the diatoms in permitting sufficient reduction of the diatoms to break up the air cells, this being due to the unctuous quality of the talc. Talc is thus to a considerable extent the equivalent of asbestos, though the product, where talc is used and asbestos is not used, will not be as tough.

The colors in the form of powders are preferably ground with the diatoms and asbestos so as to grind the colors right into the ground diatoms. In the case, however, that the asbestos is burned and the color brought out, as before described, the diatom is being colored with the colors from the fiber. The artificial colors used are dry powdered colors and the binder used is glue or casein. The colors and the binder can be added and mixed without grinding but it is preferable to grind the colors and the binder with the whole mixture.

Having described my invention, what I claim is:—

1. A coating composition including infusorial earth, pulverized to a degree where the air cells of the infusorial earth are broken and a finely pulverized, dry, agent which is unctuous to the touch.

2. A coating composition including diatomaceous earth pulverized to a degree wherein the air cells of the diatoms are broken, and a finely pulverized, dry, mineral agent which is unctuous to the touch.

3. A coating composition including finely pulverized asbestos, and diatomaceous earth pulverized to a degree where the air cells of the separate diatoms are broken.

4. A coating composition including a finely pulverized fibrous mineral which is unctuous to the touch, and diatomaceous earth pulverized to a degree where the individual diatoms are broken.

5. A coating composition including a finely pulverized mineral of the hornblende group, diatomaceous earth pulverized to a degree where its separate diatoms are broken, and coloring matter.

6. A coating composition including a finely pulverized mineral of the hornblende group, and finely pulverized diatomaceous earth, the first named ingredient having a degree of fineness such that the particles will float in water and the second named ingredient being sufficiently pulverized to break the air cells of the separate diatoms.

7. A coating composition including finely pulverized infusorial earth, a finely pulverized dry, fibrous agent, and finely pulverized talc.

8. A coating composition comprising diatomaceous earth pulverized to a degree where its air cells are broken, a mineral of the hornblende group pulverized to a degree whereby its individual fibers are separated and the particles will float in water, coloring matter, and a binder.

9. A coating composition including from 30% to 60% of finely pulverized mineral of the hornblende group, 40% to 70% of finely pulverized diatomaceous earth pulverized to a degree where its air cells are broken, and a binder.

10. A step in the process of preparing coating compositions comprising mixing pulverized diatomaceous earth with a pulverized, dry, mineral agent, and further pulverizing the mixture until the air cells of the separate diatoms are broken.

11. The process of preparing coating compositions including pulverizing a mineral of the hornblende group to a degree where its individual fibers are separated and the particles will float in water, pulverizing diatomaceous earth, mixing the pulverized hornblende with the pulverized earth, and then further pulverizing the mixture to an extent where the air cells of the diatoms are broken.

12. The process of preparing coating compositions comprising pulverizing a mineral of the hornblende group to a degree where its individual fibers are separated and will float in water, mixing a finely pulverized dry mineral with the first named mineral and then further pulverizing the mixture to a fineness beyond that to which the components of the mixture were initially pulverized.

13. The process of preparing coating compositions comprising pulverizing a mineral of the hornblende group to a degree where its individual fibers are separated and the particles will float in water, finely pulverizing diatomaceous earth, mixing pulverized coloring matter with the pulverized mineral and earth, and mixing the earth and mineral together and then further pulverizing the mixture to an extent where the air cells of the diatoms contained in the earth are broken.

In testimony whereof I hereunto affix my signature in the presence of two witnesses.

JOHN E. SCHNEIDER.

Witnesses:
G. E. STEINER,
FRANCES McOMBER.

Copies of this patent may be obtained for five cents each, by addressing the "Commissioner of Patents, Washington, D. C."